US007079652B1

(12) United States Patent
Harris

(10) Patent No.: US 7,079,652 B1
(45) Date of Patent: Jul. 18, 2006

(54) LOGIN RENEWAL BASED ON DEVICE SURROUNDINGS

(76) Inventor: Scott C. Harris, P.O. Box 927649, San Diego, CA (US) 92192

( * ) Notice: Subject to any disclaimer, the term of this patent is extended or adjusted under 35 U.S.C. 154(b) by 736 days.

(21) Appl. No.: 09/681,570

(22) Filed: May 1, 2001

(51) Int. Cl.
*H04K 1/00* (2006.01)

(52) U.S. Cl. .................... 380/258; 726/2; 340/539.13
(58) Field of Classification Search ........ 713/200–202, 713/182; 380/258; 701/213–216; 340/539.13; 342/43; 726/2
See application file for complete search history.

(56) References Cited

U.S. PATENT DOCUMENTS

| | | | | |
|---|---|---|---|---|
| 4,816,654 A | * | 3/1989 | Anderl et al. ............... 235/380 |
| 5,289,540 A | * | 2/1994 | Jones ........................... 713/165 |
| 5,532,690 A | * | 7/1996 | Hertel .......................... 340/989 |
| 5,544,321 A | * | 8/1996 | Theimer et al. ............. 709/226 |
| 5,757,916 A | * | 5/1998 | MacDoran et al. .......... 380/258 |
| 5,799,082 A | * | 8/1998 | Murphy et al. .............. 713/179 |
| 6,161,185 A | * | 12/2000 | Guthrie et al. ............... 713/201 |
| 6,308,273 B1 | * | 10/2001 | Goertzel et al. ............. 713/201 |
| 6,317,500 B1 | * | 11/2001 | Murphy ........................ 380/258 |
| 6,609,198 B1 | * | 8/2003 | Wood et al. ................. 713/155 |
| 6,614,349 B1 | * | 9/2003 | Proctor et al. ............ 340/572.1 |
| 6,778,837 B1 | * | 8/2004 | Bade et al. ................. 455/456.1 |
| 2002/0083323 A1 | * | 6/2002 | Cromer et al. ............... 713/176 |

* cited by examiner

*Primary Examiner*—Emmanuel L. Moise
*Assistant Examiner*—Minh Dieu Nguyen

(57) ABSTRACT

A system of allowing user login to a computer. The user is allowed to login by entering some kind of personal identification information e.g. biometric, password or hand. Once login, the computer detects its surroundings. The surrounding detecting can be by GPS, e.g. to detect location, or can use a camera to detect of view of a user. When the user does not properly login, account of the incorrect login is maintained. Each increment of the incorrect login's causes the security to increase.

14 Claims, 5 Drawing Sheets

LOGIN RENEWAL BASED ON DEVICE SURROUNDINGS

BACKGROUND OF INVENTION

The miniaturization of electronics allows computers to be made smaller and hence more portable. A problem arises with the security of these computers. Confidential and personal data may be stored on the computers. However, as the computer becomes more portable, it actually becomes easier to be improperly absconded. For example, laptop computers, PDAs, cell phones, and other portable computing devices may be stolen. The data on the device may then fall into improper hands. Various crimes may be perpetuated with the data, including identity stealing.

It is known to control access to these computers using password protection. However, the frequency and difficulty of password entry needs to be balanced between inconvenience to the user and proper security. Programs such as PDA bomb on a PDA require that the user enter a password each time to power on the PDA. This could require that the user enter a password many times per day and even many times per session. This may become inconvenient to the user, who then may often turn off the password protection mechanism entirely. The problem is that once off, the security is totally defeated.

SUMMARY OF INVENTION

The present application teaches a system of security protection on a portable computer. One aspect of the invention detects the surroundings of the portable computer and determines when a new security routine needs to be run based on the change of surroundings. Another aspect teaches continuous levels of protection which determine certain aspects of security, and continuously varies the amount of security protection that is provided.

BRIEF DESCRIPTION OF DRAWINGS

These and other aspects of the invention will be described in detail with reference to the accompanying drawings, wherein.

DETAILED DESCRIPTION

Many computers now include the ability to sense some aspect of their surroundings. For example, many PDAs, and laptops now include cameras (eyes) and microphones (ears). In some embodiments, these eyes and ears may also be located on smartcard devices, other credit cards, portable telephones, and other computers. These sensory devices make the computing device into one which is aware of its surroundings.

In addition, many computers now have the ability to communicate with multiple different communication objects. Wireless ethernet systems, such as wireless LAN and the like may be used. Bluetooth systems may be used for communication. In addition, other communications systems such as short range and longer range cellular communications may be used. At least one cellular telephone company has a plan to allow short range communications which may call a "blip", for example.

Figure 1:
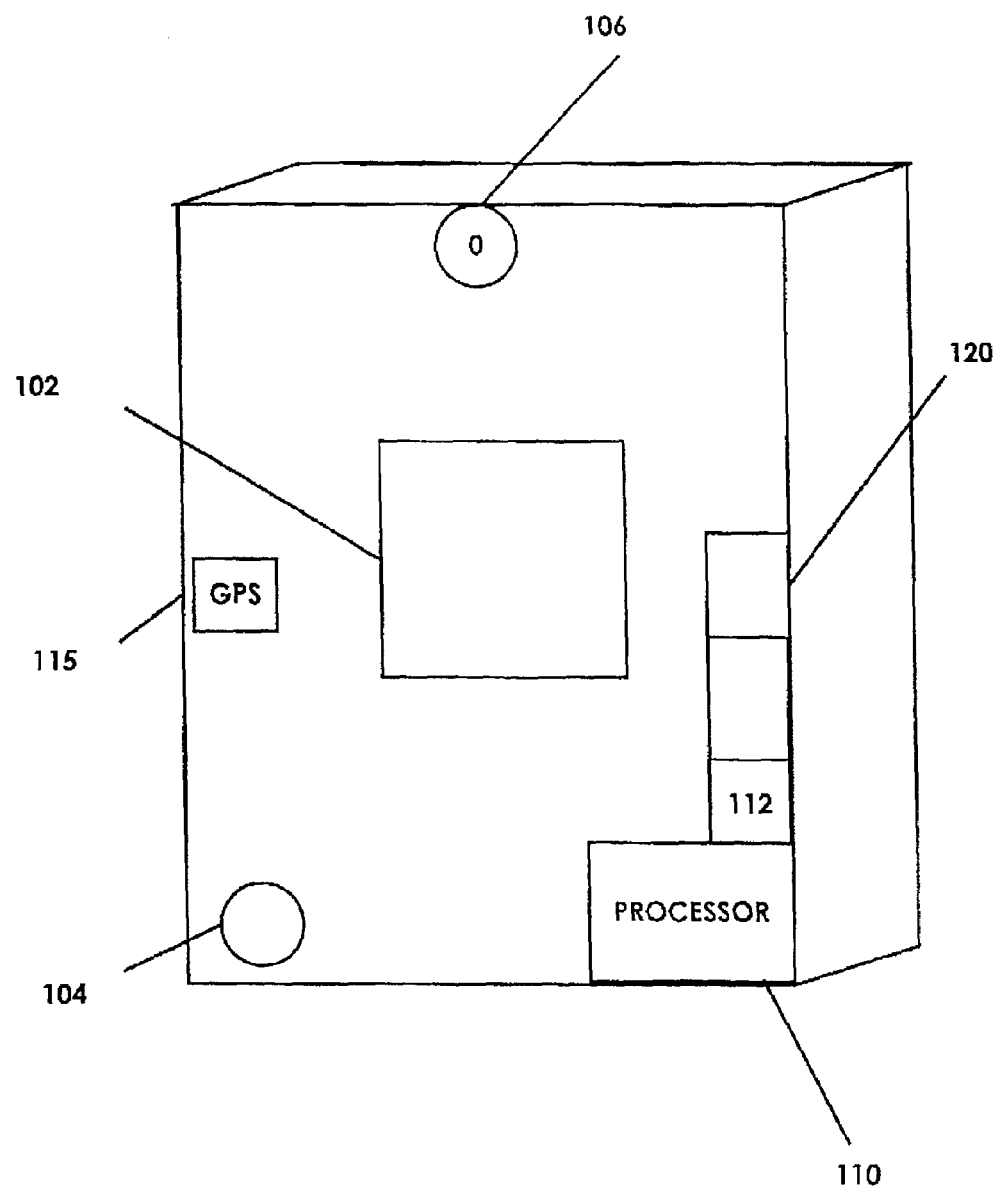
FIG. 1 shows a computer system.

The present system teaches a security system for such a computer. FIG. 1 shows an exemplary computer with a display screen 102, a microphone 104, and a camera 106. All of the information is processed by an internal processor 110, which may be any conventional kind of processor. The processing may also include memory 112. The PDA may also include the ability to communicate, shown here is as communications module 120. The computer may also include a device which senses its position e.g. a GPS or other locating device. The communication may be either wireless Ethernet, wireless LAN, Bluetooth or the like, or may alternatively be via a wired connection such as via serial or USB port.

Figure 2:
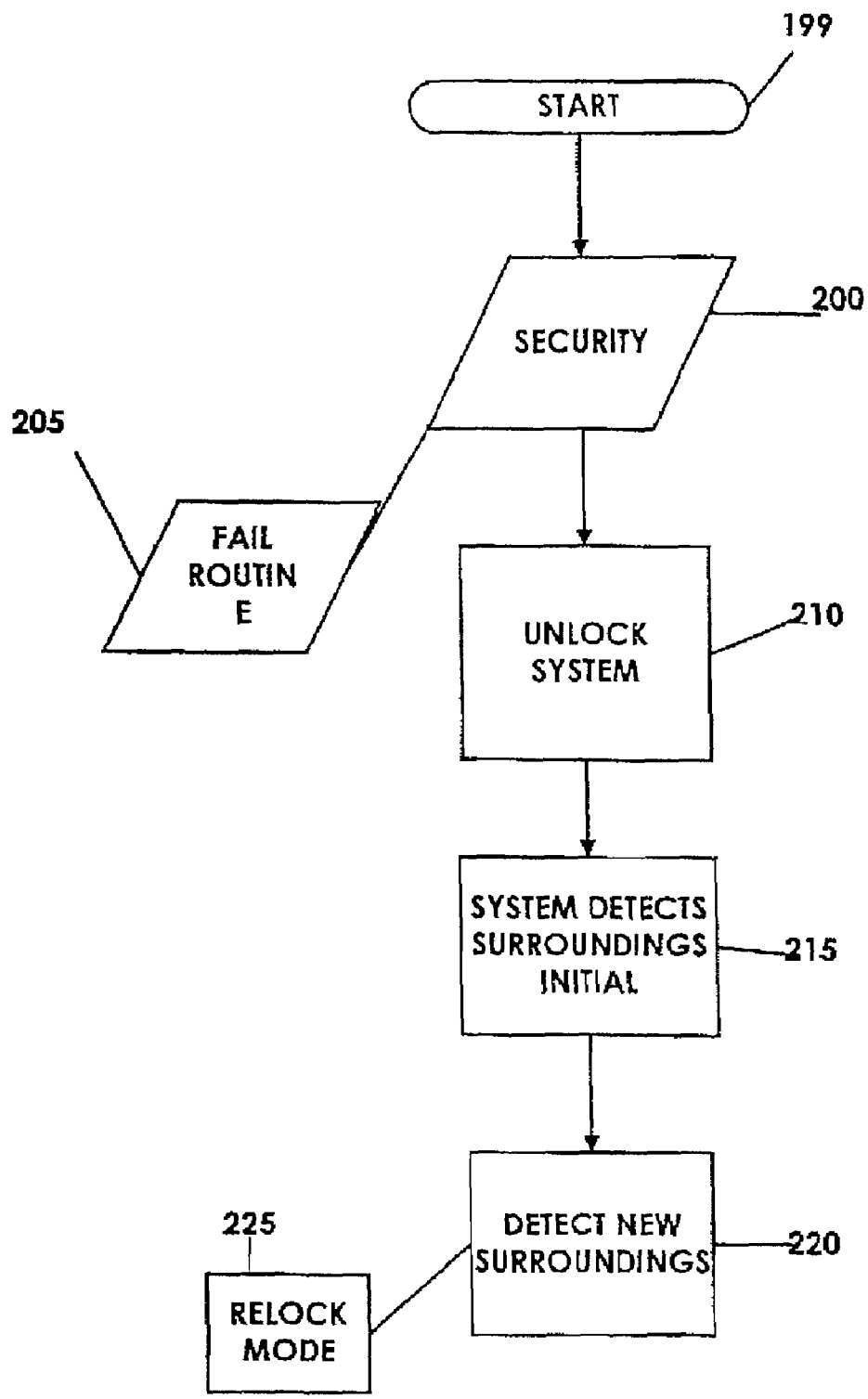
FIG. 2 shows a flowchart of a security routine.

The processor 110 runs a routine shown in flowchart form in FIG. 2. 199 represents a start operation. The start operation may occur at the power on time of the computer, or at some other time. A security prompt is carried out at 200. The security prompt may include one of a number of different conventional techniques of ascertaining the identity of an authorized user. This may include a logon with username and password, a biometric scan such as fingerprint, retinal scan or other biometric identification such as voice recognition, entry of a pin or other conventional identification technique. If the security fails, then flow passes to the failure routine at 205. The failure routine may be conventional; i.e., simply allow a certain number of tries before total lockout. Alternatively, the failure routine may include the specific failure routine described herein.

If the login passes the routine, then control passes to 210 where the system is unlocked. The unlocked system then allows normal operations, as conventional. According to the present system, once unlocked, the system space unlocked until a specified stimulus causes the system to relock. In the embodiment of FIG. 2, the stimulus is the surroundings of the device.

At 215, the system detects its surroundings. This may be done using any of the sensory devices within the PDA. The initial scan of surroundings that takes place at 215 may therefore include any one of: detection of location by GPS; detection of surroundings by a camera view of the surroundings; or any other. For this embodiment, the GPS embodiment will be described. The detection of surroundings then obtains a position where the computer is located via GPS. The system then stays unlocked so long as these surroundings stay the same by a certain amount. The system may be powered down, and may go into various standby modes. At 220, a periodic check is made to detect new surroundings. In this embodiment, the new surroundings may include a new position. If the new surroundings have changed at 225, then the system enters a security mode. The security mode may occur immediately, or may occur at the next pause. For example, the next time that the computer is powered down, the control security routine at 200 is again executed. If the surroundings have not changed at 220, then control again passes to 215.

The GPS embodiment may work well for a computer. As long as the user stays within a predetermined geographical location, e.g. within the room they are working, the system stays unlocked. It is only re locked when the user moves more than a certain amount, e.g. takes the computer out of the building or out of the room. Therefore, if the device is stolen, when it is moved out of the room, the security routine is run, and the device is locked. However, if the device stays in the room, then the user stays unlocked; the user is not bothered to re-enter the password or security, even if there is a power down or the like.

GPS techniques may not work well indoors, and hence other position location techniques can be used, including detection of IP address on a connected computer, caller ID, triangulation of communication (e.g. Bluetooth or cellular communications or blips), and others.

In addition, the times when GPS coordinates are taken can be timed. For example, the login may simply use the last good GPS coordinate as the current position. A time can be established by when the next coordinate needs to be taken.

An alternative embodiment takes a picture of the user, and recognizes the user using machine vision techniques. So long as the user stays near the camera, the system stays unlocked. When the system powers down, obviously the user need not be close by during the time of power down. In this embodiment, therefore, the operation 220 of detecting new surroundings may occur at carefully selected times, e.g. each time the computer returns from some kind of standby modes either powered down or other standby operation. If the user detected at 215 is still close by, then the system stays unlocked. Otherwise, the system is locked at 225 and the user must again follow the security procedure.

Figure 2A:
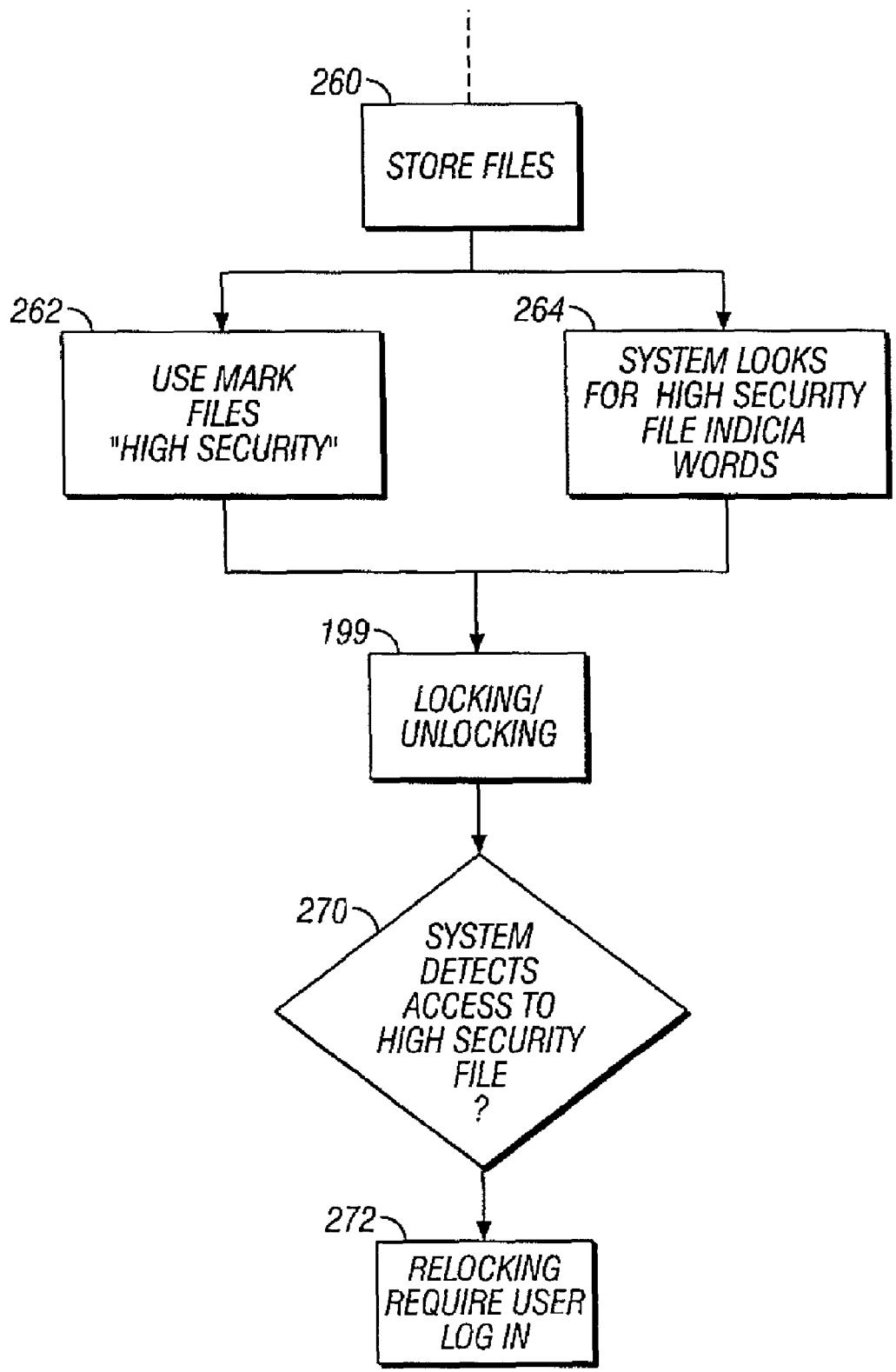
FIG. 2A shows a flowchart of alternative security routine that provides security based on the kind of file.

Yet another embodiment of the stimulus for relocking the computer may be initiated by access to specified high security files. It should be understood that a danger of an absconded computer occurs when an unauthorized user obtains access to the user's personal information. A modification of the FIG. 2 embodiment is shown in FIG. 2A. At 260, the user stores a number of files. These files can be handled in either or both of the ways shown in 262 and 264. In 262, the user manually marks the file as high security. At 264, the system searches for the file contents to look for "indicia words" which are likely to be present and files that often require high security. Example indicia words may include words such as "account No.", "password", and the like. The user may add to the list of indicia words. Either of these techniques can be used to mark a high security file.

199 generically represents the locking and unlocking routine shown in FIG. 2. The file remains unlocked once the proper user identification is entered until a specified stimulus occurs. At 270, the system, e.g. a file manager running within the operating system, detects attempted access to a high security file. When this access is detected at 270, the system automatically takes this as the stimulus which causes a re locking operation. This means that upon attempted access to one of these files, the system requires the user to log in and identify themselves again.

The operation at 270 can occur anytime that the user requests access to a high security file, or alternatively can occur anytime that this action occurs within a specified time after the user has identified themselves. For example, a user identification may be valid for 10 minutes and prevent re locking within those 10 minutes even if the user requests access to the high security file.

Figure 3:
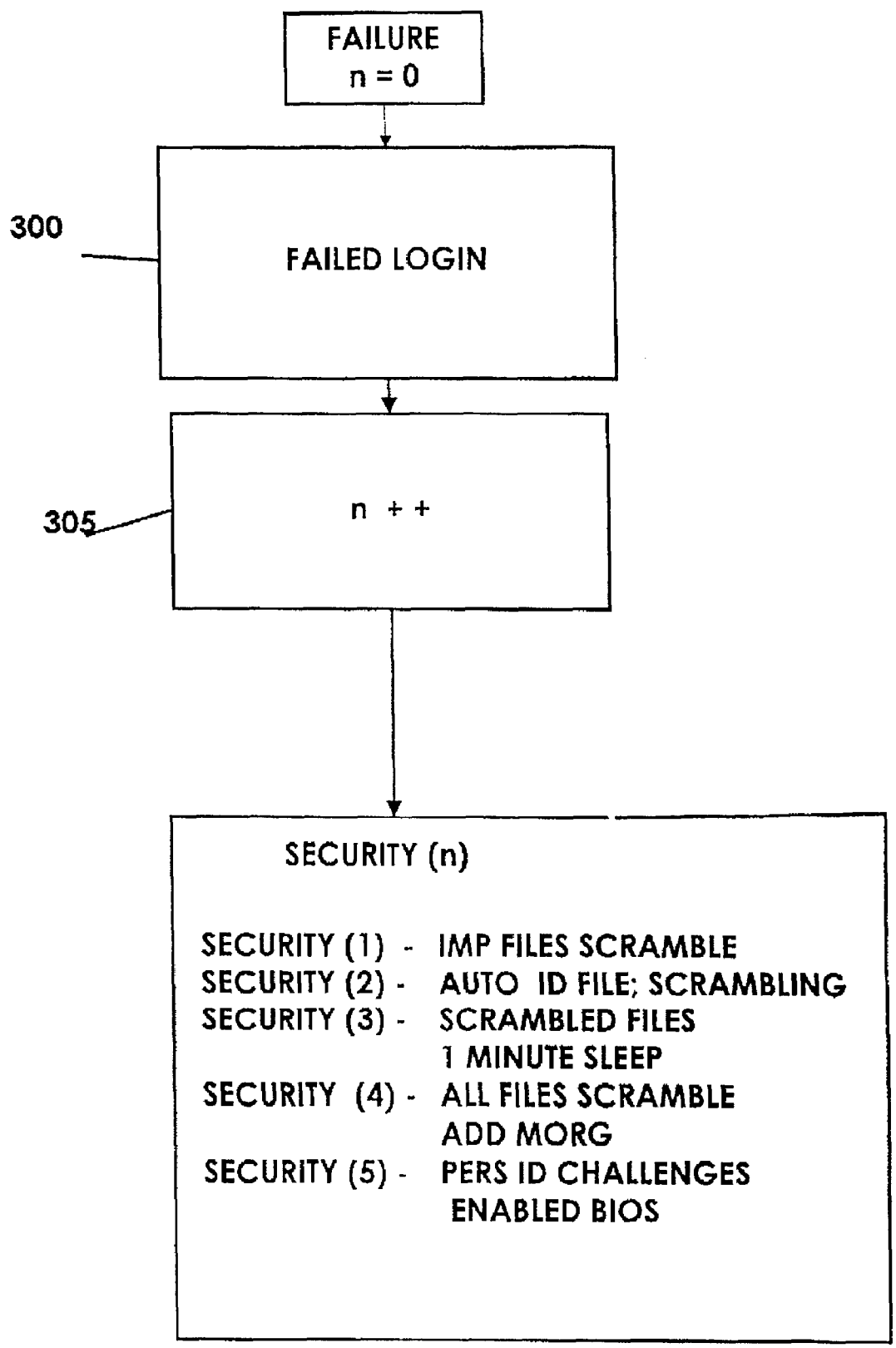
FIG. 3 shows a flowchart of a login attempt failure routine.

A specific embodiment of the fail routine in 205 is shown in flowchart form of FIG. 3. Many existing security systems include a fail routine. For example, a system often allows a certain number of attempted logins to a system, and then totally locks out the user. This can be extremely inconvenient, since the user is allowed only a certain number of tries. In other security systems, such as PDA bomb, after a certain number of tries, which is usually selectable, all of the data on the computer is scrambled. This extreme response may discourage users from enabling this security routine. However, without such a system, an unauthorized user of the computer has a virtually unlimited number of tries to guess the proper password.

The failure routine of FIG. 3 uses a continuously variable system which changes the amount of security based on the number of failed tries. Each time there is a failed try at security entry, additional security is added; so that it becomes more difficult to bypass the security system. An end result after a certain number of login tries may in fact be a scrambling of the data, or alternatively may simply be that so much security is added that it becomes infeasible to bypass the system.

At 300 the system detects a failed login. This failed login may take a number of different forms. One form of failed login is preferably the user powering off in response to a request for login identification. An unauthorized user may power off the system in response to a login, while they try to deduce the desired login information. A failed login at 300 causes an increment of the login counter at 305. 310 then represents a security routine as a function of the counter. If the counter has a value 1, then important files are scrambled using a security key. The important files may be only those files identified by the user as being particularly sensitive. Usually a user does not want to scramble all files, since doing so may unacceptably degrade the speed of the device. With security level two, an automatic identification of keywords which are likely to be important, such as account numbers, passwords and other keywords is carried out. Those automatically identified files are then scrambled.

At security level 3, more files are scrambled, which may be automatically identified. In addition, security level 3 may began a timeout such as a one minute sleep period during which login becomes impossible.

At security level 4, additional operations may be carried out. All files may be scrambled for example and an additional time of sleep such as five minutes may be required.

At security level 5, personal identification challenge may be required. This personal challenge can be information which has been previously entered into the device and may include the user's favorite color or other personal information which may be asked at random. At this time, a BIOS login may also be enabled to prevent the user from getting access to a BIOS of the computer.

Other login techniques may also be known, and other security techniques may be carried out. The point is that with each failed login attempt (where a failed login attempt may include shutting off power in response to a login prompt) provides additional security. Each time a login fails, it becomes less probable that an unauthorized user will be able to obtain information from the system.

Figure 4:
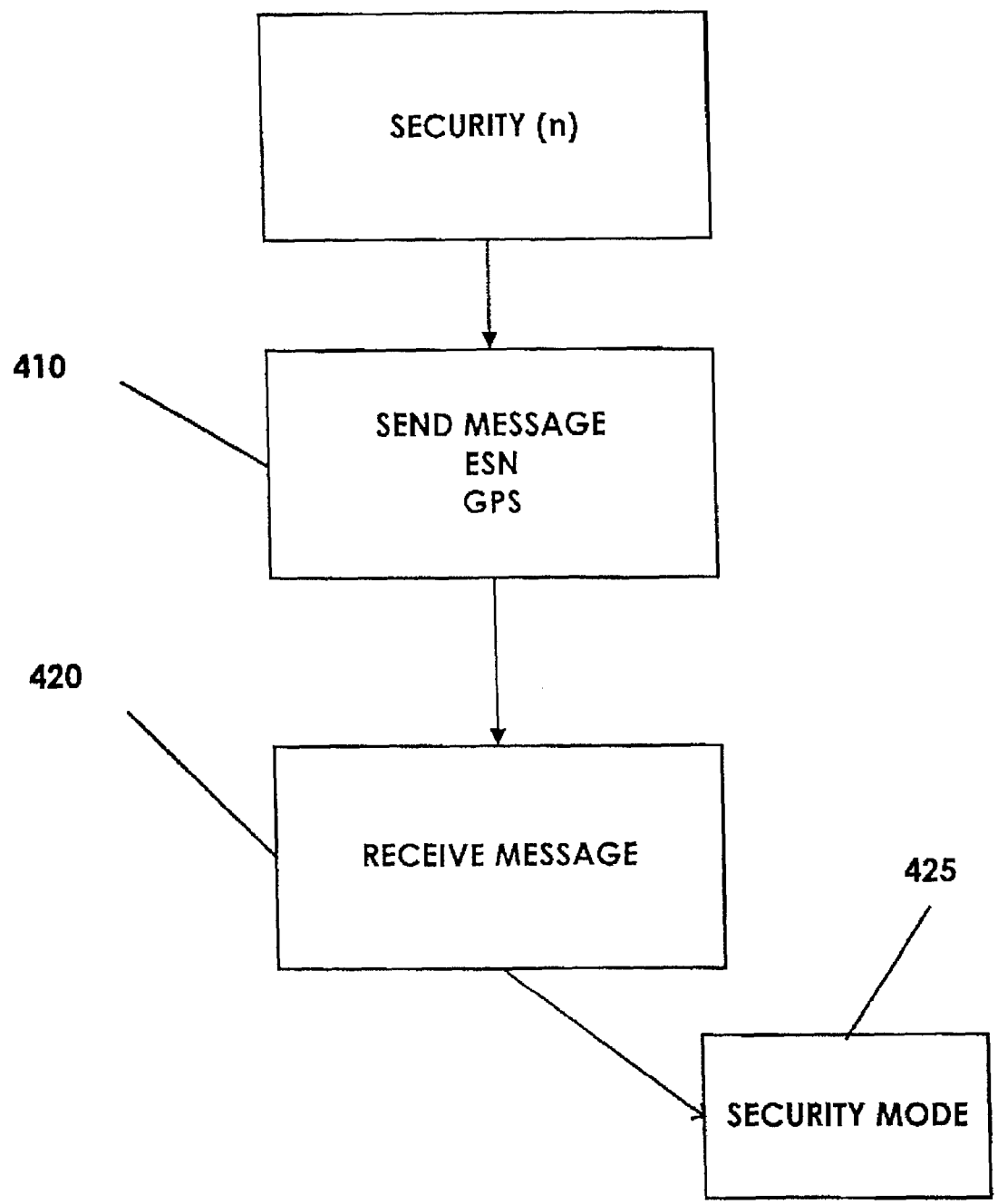
FIG. 4 shows a system of variable security levels depending on the number of failed attempts.

Yet another embodiment is shown in FIG. 4. In this embodiment, the computer 100 includes a special identification feature which runs at a specified security level of one of the weights discussed above. In this mode, the communication module 120 sends a message, either continuously or at specified discrete times, to any available receiver. This may use the "blip" system of bluetooth communication. The message may simply indicate the serial number of the computer e.g. from the computer's ESN, and any other information about the computer. The message may also include GPS information telling where the computer is physically located. Once entering this mode, any available receiver such as a Bluetooth receiver, may receive this message to provide information on security-compromised computers. An alternative system, which can be implemented in either this system or an alternative system, may receive a comparable message at 420. For example, ESNs or other identifying information about stolen or other security-compromised computers may be sent out as broadcast information to all processors within range. Upon receiving such a message, the computer which matches the criteria is placed into a special security mode in which it cannot turn on or receive any information. This security mode may be one where for example only a system technician can restart the computer.

Although only a few embodiments have been disclosed in detail above, other modifications are possible.

The invention claimed is:

1. A system comprising:
   a computer peripheral, detecting information about a first surrounding of the computer;
   a computer, running a routine which allows a user to identify themselves to the computer, and controls access to the computer based on said identify and said first surrounding; and
   wherein said computer determines a first surrounding at a time of user identification, and maintains the computer unlocked while the computer is within said first surrounding, and causes the computer to lock when the computer is detected to have moved from said first surrounding by a predetermined and relative amount.

2. A system as in claim 1, wherein said surrounding is a physical location of the computer, as detected by an automatic position location device.

3. A system as in claim 1, wherein said surrounding includes a view that is seen by the computer.

4. A system as in claim 3, wherein said view includes an image of a user.

5. A system as in claim 1, further comprising a failure processing routine, which processes failures in login by increasing security for each of a plurality of times when a login fails.

6. A system comprising:
   a computer peripheral, detecting information about a current surrounding of the computer;
   a computer, running a routine which allows a user to identify themselves to the computer, and controls access to the computer based on said identify and said current surrounding;
   wherein said computer determines a first surrounding at a time of user identification, and maintains the computer unlocked while the computer is in said first surrounding, and causes the computer to lock when the computer is detected to vary from said first surrounding by a predetermined amount; and
   further comprising a failure processing routine, which processes failures in login by increasing security for each of a plurality of times when a login fails, and increasing a security of the computer when a user powers down the computer in response to being prompted to identify themselves.

7. A method, comprising:
   carrying out a first security operation which allows a user to obtain access to resources of the computer;
   determining surroundings information, including first surroundings information associated with said first security operation, and second surroundings information at times subsequent to said first surroundings information; and
   allowing continued access to resources of the computer only so long as said second surroundings information does not differ from said first surroundings information by more than a specified relative amount of distance, and if said second surroundings information differs from said first surroundings information by more than said specified relative amount of distance, then requiring a new security operation to obtain said access to said resources.

8. A method as in claim 7, wherein said surroundings information is information indicative of a physical location of the computer, and said determining comprises using an automatic position determining device to determine said position.

9. A method as in claim 8, further comprising determining a difference between said first and second surroundings information, determining a distance between the physical locations indicated by said first and second surroundings information, determining if said distance is greater than a predetermined threshold, and allowing said continued access only when said distance is not greater than said predetermined threshold.

10. A method as in claim 7, wherein said surroundings information is information indicative of an image of a proximity of said computer, and said determining comprises using a camera to determine said image.

11. A method as in claim 10, further comprising determining a difference between a first image representing said first surroundings information, and a second image representing said second surroundings information, using automated machine vision techniques.

12. A method as in claim 7, wherein said first security operation comprises determining whether a user has successfully responded to a request for user-security information, and for each of the plurality of times that the user does not successfully respond to said request for user-security information, increasing an aspect of security.

13. A method as in claim 12, wherein said increased aspect of security includes entry of secret personal information.

14. A method, comprising:
   carrying out a first security operation which allows a user to obtain access to resources of the computer;
   determining surroundings information, including first surroundings information associated with said first security operation, and second surroundings information at times subsequent to said first surroundings information;
   allowing continued access to resources of the computer only so long as said second surroundings information does not differ from said first surroundings information by more than a specified threshold, and if said second surroundings information differs from said first surroundings information by more than said specified threshold, then requiring a new security operation to obtain said access to said resources; and
   wherein said determining comprises triangulating to determine a position.

* * * * *